(12) United States Patent
Du (10) Patent No.: US 12,502,131 B1
(45) Date of Patent: Dec. 23, 2025

(54) MODULAR HEALTH MONITORING INTELLIGENT RING

(71) Applicant: Evan Zeng Du, Potomac, MD (US)

(72) Inventor: Evan Zeng Du, Potomac, MD (US)

( * ) Notice: Subject to any disclaimer, the term of this patent is extended or adjusted under 35 U.S.C. 154(b) by 0 days.

(21) Appl. No.: 19/203,169

(22) Filed: May 9, 2025

(51) Int. Cl.
*A61B 5/00* (2006.01)
*A61B 5/01* (2006.01)

(52) U.S. Cl.
CPC .......... *A61B 5/6826* (2013.01); *A61B 5/0002* (2013.01); *A61B 5/01* (2013.01); *A61B 5/742* (2013.01); *A61B 2560/0219* (2013.01); *A61B 2560/0443* (2013.01); *A61B 2562/0219* (2013.01)

(58) Field of Classification Search
CPC ....... A61B 5/6826; A61B 5/0002; A61B 5/01; A61B 5/742; A61B 2560/0219; A61B 2560/0443; A61B 2562/0219
See application file for complete search history.

(56) References Cited

U.S. PATENT DOCUMENTS

| | | | |
|---|---|---|---|
| 9,581,972 B1* | 2/2017 | Arrow | G04G 21/00 |
| 2005/0189906 A1* | 9/2005 | Sun | A44C 5/0007 |
| | | | 320/107 |
| 2024/0053796 A1* | 2/2024 | Howard | G02B 27/0176 |
| 2024/0168521 A1* | 5/2024 | von Badinski | A61B 5/332 |

* cited by examiner

*Primary Examiner* — Amanda L Steinberg
(74) *Attorney, Agent, or Firm* — Ying-Ting Chen (57) ABSTRACT

The present invention provides a modular health monitoring intelligent ring, which includes a main body and at least one additional accessory adapted to the main body. The main body includes an annular housing, a basic module device, and a screen device. The annular housing has a receiving chamber formed therein, the basic module device is received in the receiving chamber. The annular housing has an adjusting component disposed thereon for changing an inner diameter of the annular housing. The annular housing includes a first finger kit, a second finger kit, and an intermediate finger kit. The first finger kit and the second finger kit are spliced together to form the receiving chamber. The modular health monitoring intelligent ring can solve the problems of single function and short battery endurance caused by limited internal space by selectively splicing the accessory, thereby optimizing the user experience and improving the user's wearing comfort.

10 Claims, 11 Drawing Sheets

MODULAR HEALTH MONITORING INTELLIGENT RING

BACKGROUND OF THE PRESENT INVENTION

Field of Invention

The present invention relates to the technical field of intelligent wearable devices, and in particular to a modular health monitoring intelligent ring.

Description of Related Arts

The application of intelligent wearable devices in sports and health is becoming more widespread as the technology continues to evolve, and the hardware and algorithms for monitoring have improved significantly. At the same time, as consumers become more aware of the products, they are becoming more demanding in terms of the experience of wearing the products and the accuracy of the sports and health data.

Although there are intelligent wearable devices in the form of intelligent rings in the prior art, these intelligent rings are generally integrated designs, and in actual wearing experience, convenience and wearability have greater shortcomings. Specifically, the internal space of the ring is small, and it is difficult to be equipped with a large-size battery and a variety of electronic modules with different functions when designing, which leads to a short battery life and single function of the intelligent ring; If the internal space of the ring is expanded, the size and weight of the ring will be increased, which will bring a bad wearing experience to the user.

To this end, how to design a modular health monitoring intelligent ring to overcome the above technical problems.

SUMMARY OF THE PRESENT INVENTION

In view of the deficiencies of the prior art, the present invention provides a modular health monitoring intelligent ring, which can solve the problems of single function and short battery endurance caused by limited internal space by selectively splicing the accessory, thereby optimizing the user experience and improving the user's wearing comfort.

The objective of the present invention is achieved through the following technical solutions:

A modular health monitoring intelligent ring, includes a main body and at least one additional accessory adapted to the main body, wherein the main body includes an annular housing, a basic module device, and a screen device, wherein the annular housing has a receiving chamber formed therein, the basic module device is received in the receiving chamber, the annular housing has an installation slot formed on an outer wall thereof, the screen device is installed at the installation slot, and the screen device is electrically connected with the basic module device, wherein the annular housing has an adjusting component disposed thereon for changing an inner diameter of the annular housing;

the annular housing includes a first finger kit, a second finger kit, and an intermediate finger kit, wherein the first finger kit and the second finger kit are spliced together to form the receiving chamber, the intermediate finger kit is located at an inner wall of the annular housing, and the intermediate finger kit is stuck between the first finger kit and the second finger kit;

the additional accessory has an increase module device disposed therein, and the additional accessory is detachably connected with the main body through a snap-fit device, wherein when the additional accessory is spliced with the main body, and the increase module device is electrically connected with the basic module device;

an outer shell of the additional accessory is made of elastic silicone material, and the additional accessory as a whole is a C-shaped structure.

In one of the embodiments, the snap-fit device includes a snap latch and a snap socket, the snap latch is arranged on the side wall of the first finger kit, and the snap socket is arranged on the side wall of the additional accessory, wherein when the additional accessory is spliced with the main body, the snap latch is buckled into the snap socket;

the snap latch has a one-way protruding tooth disposed thereon, and the one-way protruding tooth has an inclined surface and a flat surface;

the snap socket has a plug-in channel and a snap slot arranged therein, the snap slot cooperates with the one-way protruding tooth, and the snap slot has a blocking surface arranged thereat, wherein when the snap latch is stuck to the snap socket, the flat surface of the one-way protruding tooth is blocked by the blocking surface.

In one of the embodiments, the additional accessory has one or more pins disposed on the side wall thereof, and the first finger kit has one or more metal conductive sheets adapted to the pins disposed on the side wall thereof, wherein when the additional accessory is spliced with the main body, the pins contact the metal conductive sheets to achieve electrical connection between the increase module device and the basic module device.

In one of the embodiments, the adjusting component includes two rack belts and a fastener, wherein the two rack belts are respectively arranged at the free end of the first finger kit and the free end of the second finger kit, the fastener is used to connect the two rack belts;

the fastener has two grooves disposed thereon in opposite directions, the two rack belts correspond to the two grooves, respectively, each of the grooves has a ridge arranged therein that matches the tooth surface of each of the rack belts.

In one of the embodiments, the connection position between the first finger kit and the intermediate finger kit, and the connection position between the second finger kit and the intermediate finger kit all form a stepped gap, wherein when the first finger kit, the second finger kit, and the intermediate finger kit are combined with each other, the intermediate finger kit is allowed to cover the gap formed.

In one of the embodiments, the basic module device includes a main circuit board, a processor, and a power supply module, wherein the processor is electrically connected with the power supply module via the main circuit board;

the main circuit board includes a plurality of flexible printed circuit boards and a plurality of rigid printed circuit boards, and each of the flexible printed circuit boards is disposed between the two adjacent rigid printed circuit boards and is connected with the two rigid printed circuit boards, respectively;

the processor is disposed on one of the plurality of rigid printed circuit boards, and some of the rigid printed circuit boards have resistors and capacitors disposed thereon.

In one of the embodiments, the power supply module includes a basic battery electrically connected with the main circuit board, wherein the basic battery is arranged along the circumferential direction of the receiving chamber, and the basic battery supplies power to the processor;

the increase module device includes a spare battery, wherein when the additional accessory is spliced with the main body, the spare battery supplies power to the basic battery.

In one of the embodiments, the power supply module includes a wireless charging coil, the wireless charging coil is arranged along the circumferential direction of the receiving chamber, and the wireless charging coil is electrically connected with the main circuit board.

In one of the embodiments, the main circuit board has a temperature sensor and an acceleration sensor disposed thereon, wherein the temperature sensor and the acceleration sensor are connected with the processor, respectively.

In one of the embodiments, the main circuit board has a wireless communication module disposed thereon.

In one of the embodiments, the screen device comprises a display screen body and an outer frame, the outer frame is matched with the installation slot, and the display screen body is fixed to the installation slot through the outer frame, wherein the display screen body is electrically connected with the main circuit board.

In summary, the modular health monitoring intelligent ring of the present invention can solve the problems of single function and short battery endurance caused by limited internal space by selectively splicing the additional accessories, thereby optimizing the user experience and improving the user's wearing comfort.

BRIEF DESCRIPTION OF THE DRAWINGS

In order to more clearly illustrate the technical solution of the embodiment of the present invention, the accompanying drawings that need to be used in the embodiment will be briefly introduced below.

DETAILED DESCRIPTION OF THE PREFERRED EMBODIMENT

In order to facilitate the understanding of the present invention, the present invention will be described more comprehensively below with reference to the relevant drawings. Persons skilled in the art can readily appreciate other advantages and efficacies of the present invention from the disclosures in the specification. It should be noted that the structure, proportion, size, etc. illustrated in the accompanying drawings are only used to match the content of the specification for the understanding and reading of persons skilled in the art, and are not intended to limit the implementation of the present invention, and therefore do not have any technical substantive significance, and any structural modification, change in proportion, or adjustment of the size, without prejudice to the efficacy of the present invention and to achieve the purpose, should still fall within the scope of the technical content of the present invention. At the same time, the terms such as "upper", "lower", "left", "right" and "middle" used in the specification are only for the convenience of description and are not used to limit the scope of implementation of the present invention, or to change or adjust their relative relationships. In the absence of substantial change in the technical content, it shall also be regarded as the scope of the present invention that can be implemented.

Unless otherwise defined, all technical and scientific terms used herein have the same meanings as commonly understood by those skilled in the art of the present invention. The terms used in the description of the present invention herein are for the purpose of describing specific embodiments only and are not intended to limit the present invention. The term "and/or" used in the specification includes any and all combinations of one or more of the associated listed items.

Figure 1:
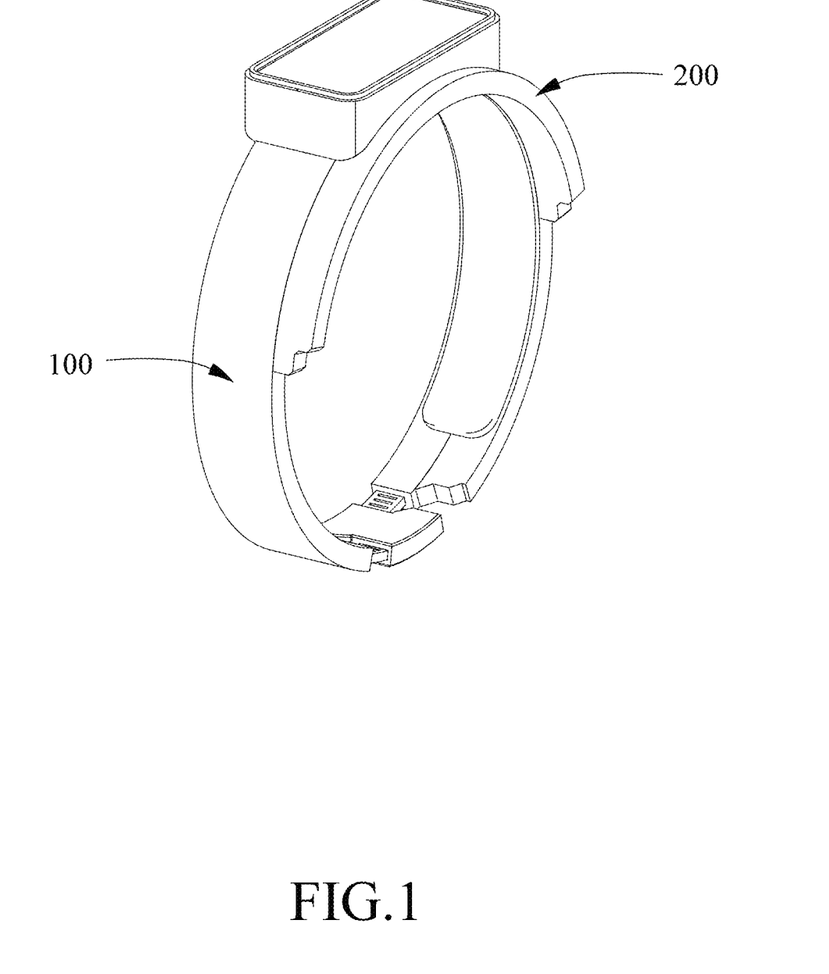
FIG. 1 is a view of a use state of the modular health monitoring intelligent ring of the present invention.
Figure 2:
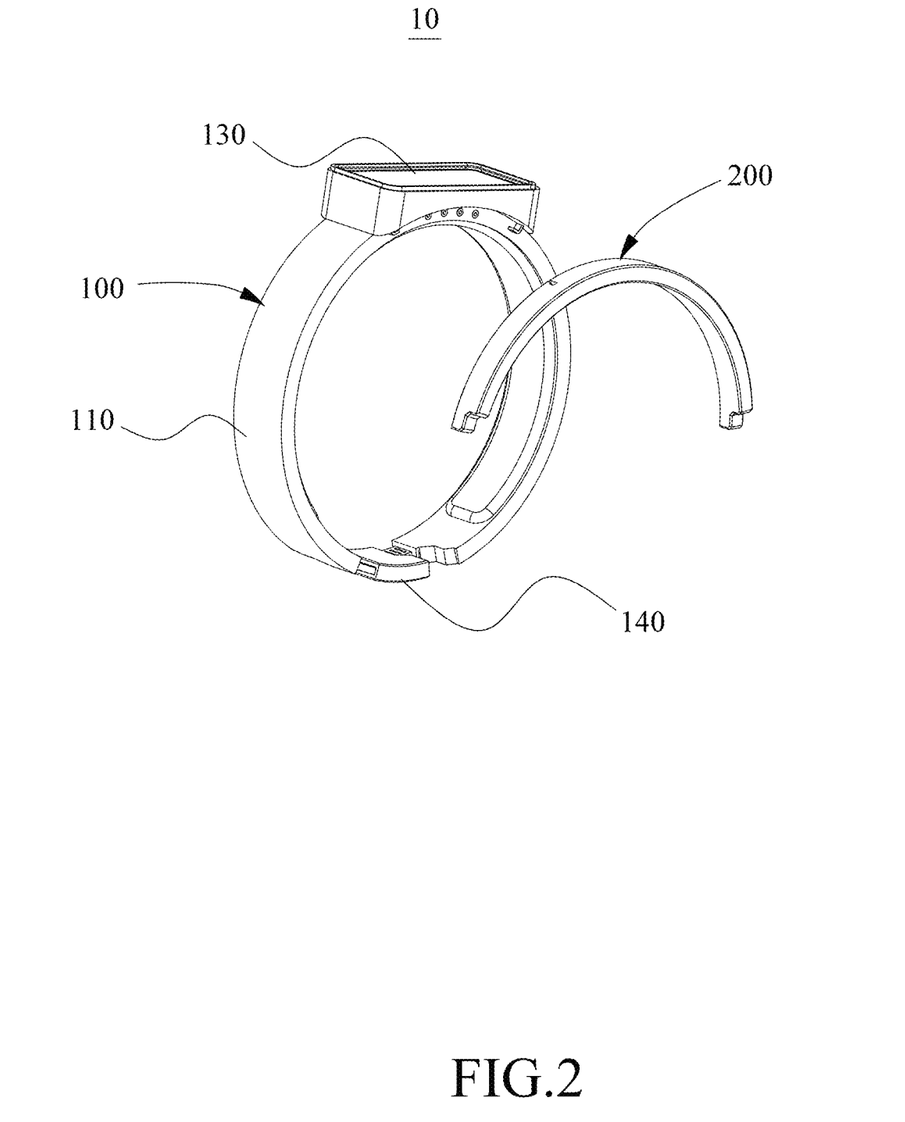
FIG. 2 is a structural view of the modular health monitoring intelligent ring of the present invention.

The present invention provides a modular health monitoring intelligent ring 10, as shown in FIGS. 1 and 2, which includes a main body 100 and at least one additional accessory 200 adapted to the main body 100.

Figure 3:
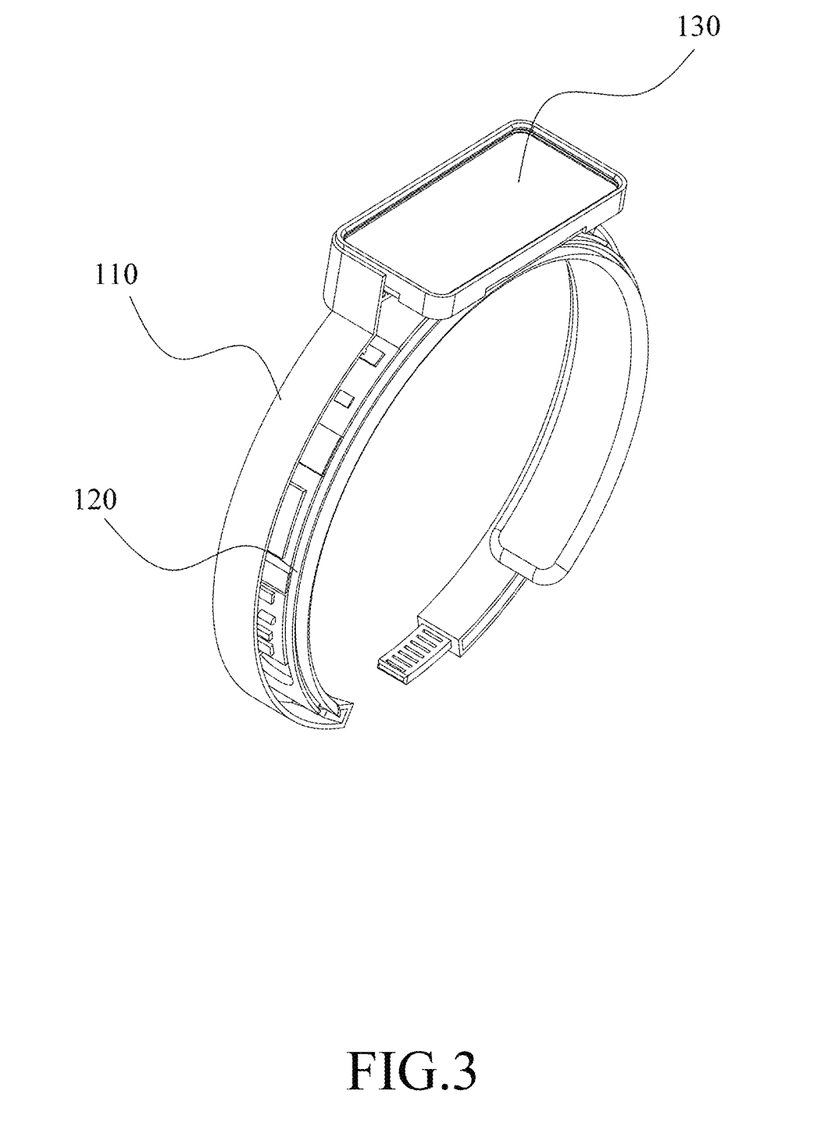
FIG. 3 is an internal structure view of the main body shown in FIG. 2.
Figure 4:
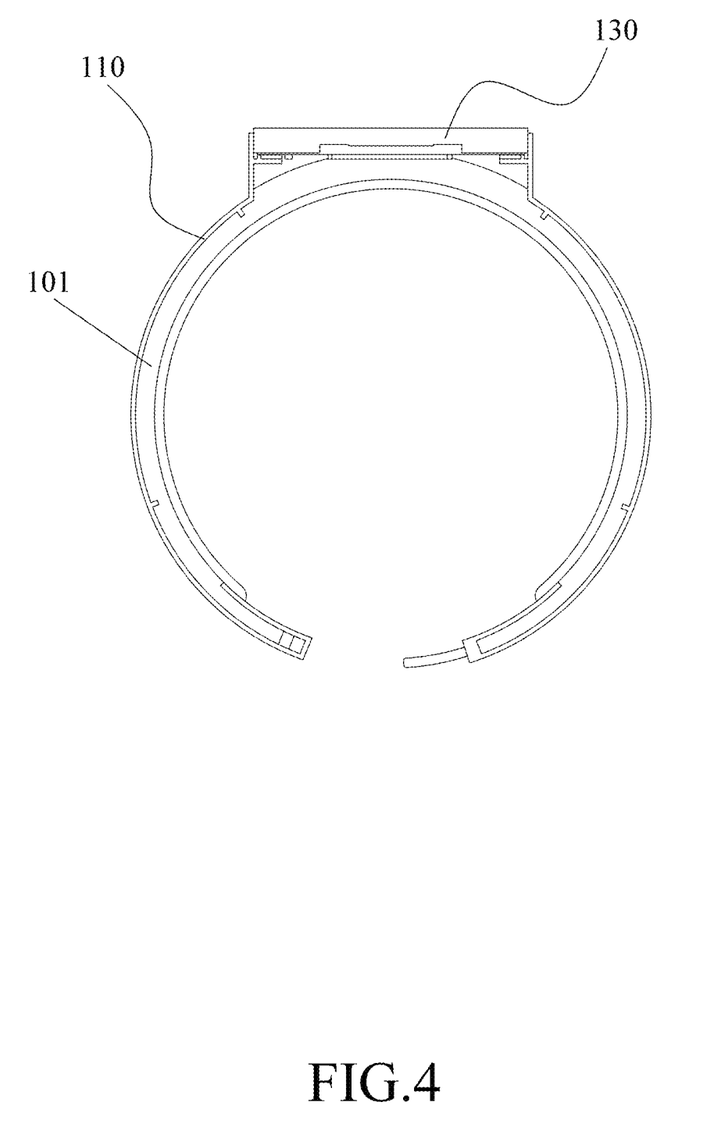
FIG. 4 is a plan sectional view of the annular housing shown in FIG. 3.
Figure 5:
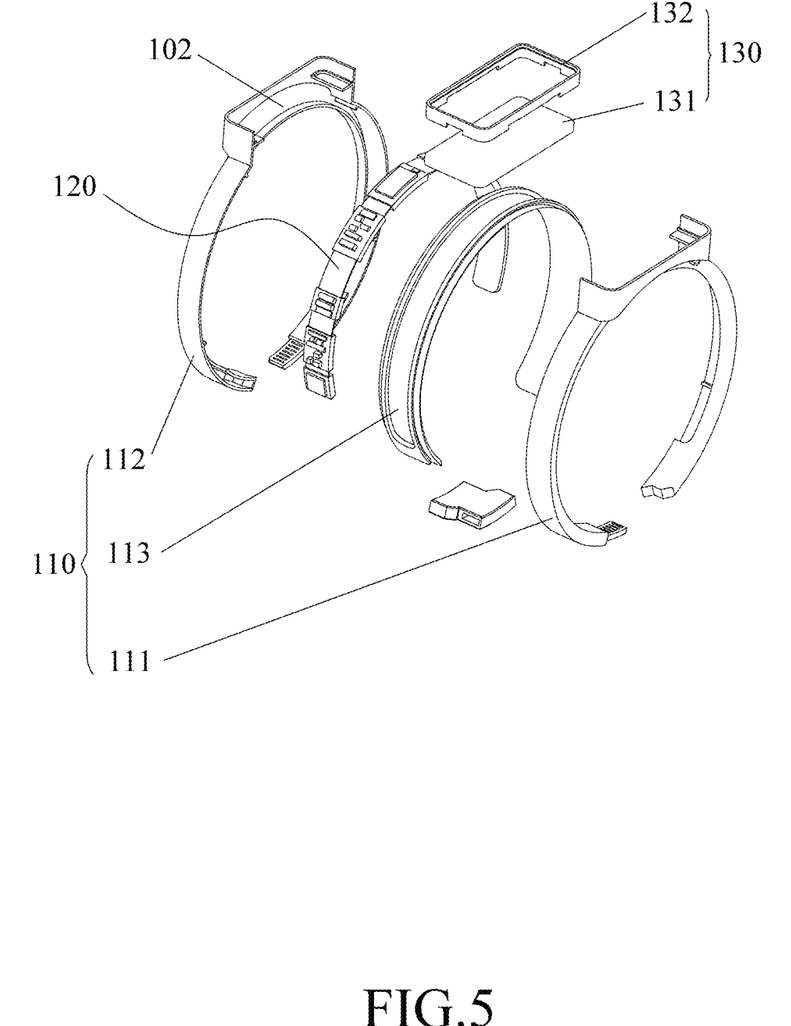
FIG. 5 is an exploded view of the main body shown in FIG. 2.

As shown in FIGS. 2 and 3, wherein the main body 100 includes an annular housing 110, a basic module device 120, and a screen device 130, wherein the annular housing 110 has a receiving chamber 101 formed therein (as shown in FIG. 4), the basic module device 120 is received in the receiving chamber 101, the annular housing 110 has an installation slot 102 formed on an outer wall thereof (as shown in FIG. 5), the screen device 130 is installed at the installation slot 102, and the screen device 130 is electrically connected with the basic module device 120. The annular housing 110 further has an adjusting component 140 disposed thereon for changing an inner diameter of the annular housing 110.

As shown in FIG. 5, the annular housing 110 includes a first finger kit 111, a second finger kit 112, and an intermediate finger kit 113, wherein the first finger kit 111 and the second finger kit 112 are spliced together to form the receiving chamber 101, the intermediate finger kit 113 is located at an inner wall of the annular housing 110, and the intermediate finger kit 113 is stuck between the first finger kit 111 and the second finger kit 112.

Figure 6:
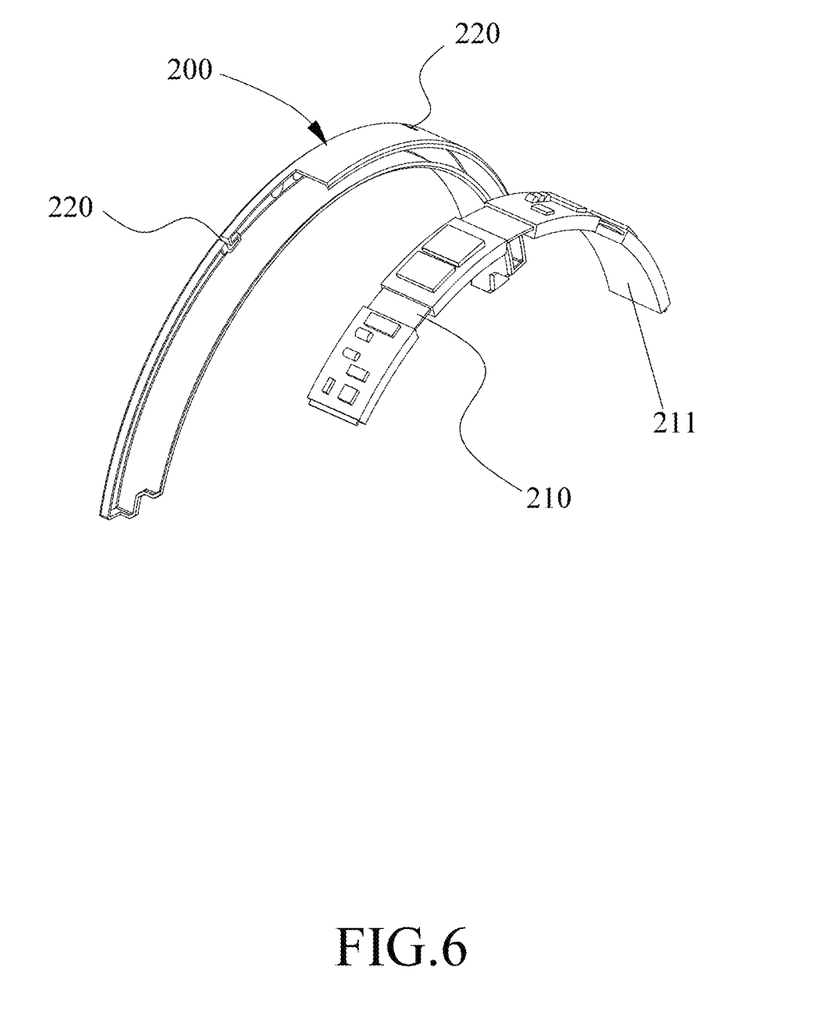
FIG. 6 is an exploded view of the additional accessory shown in FIG. 2.

As shown in FIG. 6, the additional accessory 200 has an increase module device 210 disposed therein, and the additional accessory 200 is detachably connected with the main body 100 via a snap-fit device 220. When in use, the additional accessory 200 is spliced with the main body 100, and the increase module device 210 is electrically connected with the basic module device 120.

Figure 7:
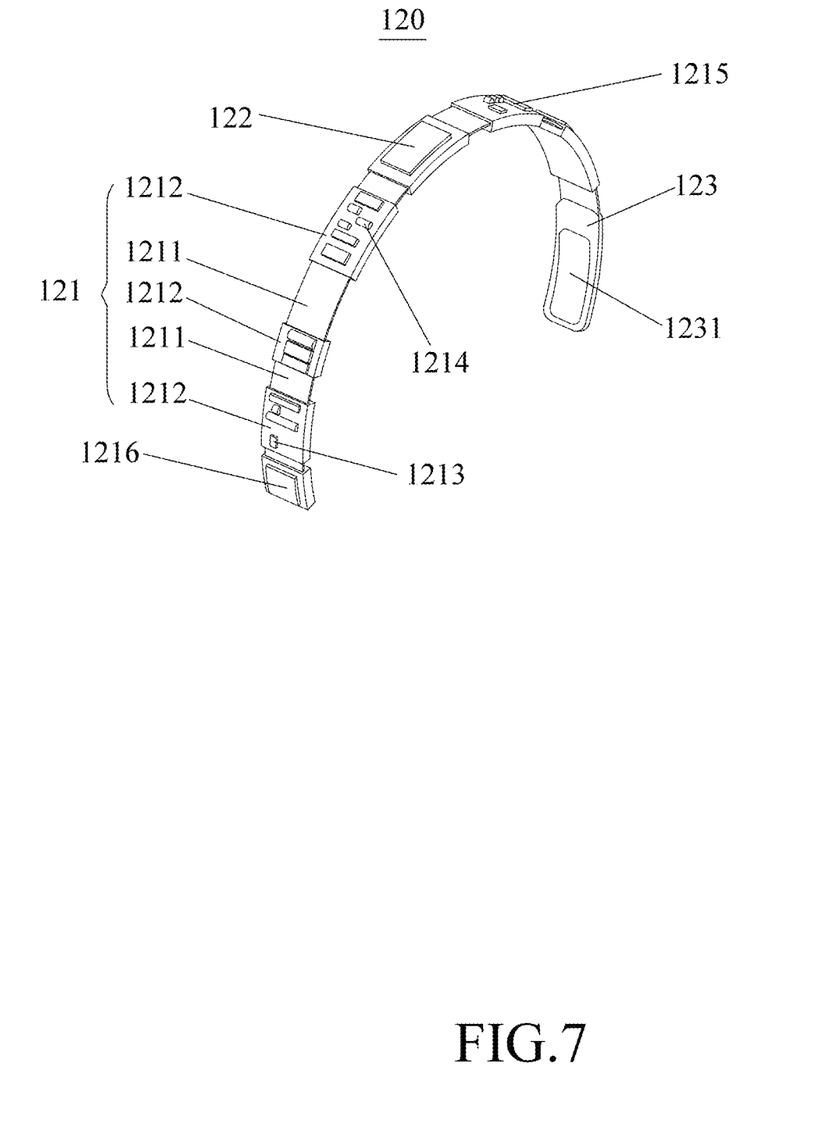
FIG. 7 is a structural view of the basic module device shown in FIG. 5.

As shown in FIG. 7, the basic module device 120 includes a main circuit board 121, a processor 122, and a power supply module 123, wherein the processor 122 is electrically connected with the power supply module 123 via the main circuit board 121. The main circuit board 121 includes a plurality of flexible printed circuit boards 1211 and a plurality of rigid printed circuit boards 1212, and each flexible printed circuit board 1211 is disposed between two adjacent rigid printed circuit boards 1212 and is connected with the two rigid printed circuit boards 1212 respectively. The processor 122 is disposed on one of the plurality of rigid printed circuit boards 1212, and some of the rigid printed circuit boards 1212 further have at least one resistor 1213 and at least one capacitor 1214 disposed thereon.

In the embodiment, the main circuit board 121 has a temperature sensor 1215 and an acceleration sensor 1216 disposed thereon, wherein the temperature sensor 1215 and the acceleration sensor 1216 are connected with the processor, respectively. The temperature sensor 1215 is used to collect a user's body temperature, and the acceleration sensor 1216 is used to obtain a user's movement or sleep state, and then the two transmit the obtained information to the processor 122 in real time, and the processor 122 performs further analysis. In other embodiments, the main circuit board 121 has a wireless communication module disposed thereon, so that the main body 100 has a remote communication function.

In combination with the above structure, the working principle of the modular health monitoring intelligent ring 10 of the present invention is explained below:

During daily wear, the user may choose to wear only the main body 100, and realize the basic function of the modular health monitoring intelligent ring 10 through the basic module device 120 arranged inside the main body 100. For example, in the embodiment, the basic module device 120 includes a temperature sensor 1215 and an acceleration sensor 1216, which allows a real-time monitoring and feedback of the user's physical condition by monitoring the temperature, movement frequency and strength of the user's finger. Of course, the basic module device 120 can also have a skin moisture detection sensor arranged thereon (not shown), which is used to collect the user's skin moisture, or a bias motor arranged thereon to provide a vibration feedback to the customer.

The modular health monitoring intelligent ring 10 of the present invention also has at least one additional accessory 200 equipped for the user, and some of the infrequently used increase module device 210 are arranged in the additional accessory 200. When the user needs to apply the corresponding function of the increase module device 210, the additional accessory 200 are selectively installed on the main body 100. For example, the increase module device 210 is allowed to be a GPS positioning module, which provides a location positioning function for the modular health monitoring intelligent ring 10 after splicing, so that the user can conveniently record the movement track when exercising outdoors.

In addition, the size of the intelligent ring in the prior art is limited, and a large-capacity battery cannot be installed therein, so the battery life is short. In the present invention, the additional accessory 200 is also allowed to be used as an additional power source to provide power to the main body 100, thereby achieving a longer battery endurance. Specifically, in the embodiment, the power supply module 123 includes a basic battery 1231 electrically connected with the main circuit board 121, wherein the basic battery 1231 is arranged along the circumferential direction of the receiving chamber 101, and the basic battery 1231 supplies power to the processor 122, wherein the increase module device 210 includes a spare battery 211. When the additional accessory 200 is spliced with the main body 100, the spare battery 211 supplies power to the basic battery 1231, thereby allowing the basic battery 1231 to be replenished with power without affecting the use of the user.

Figure 8:
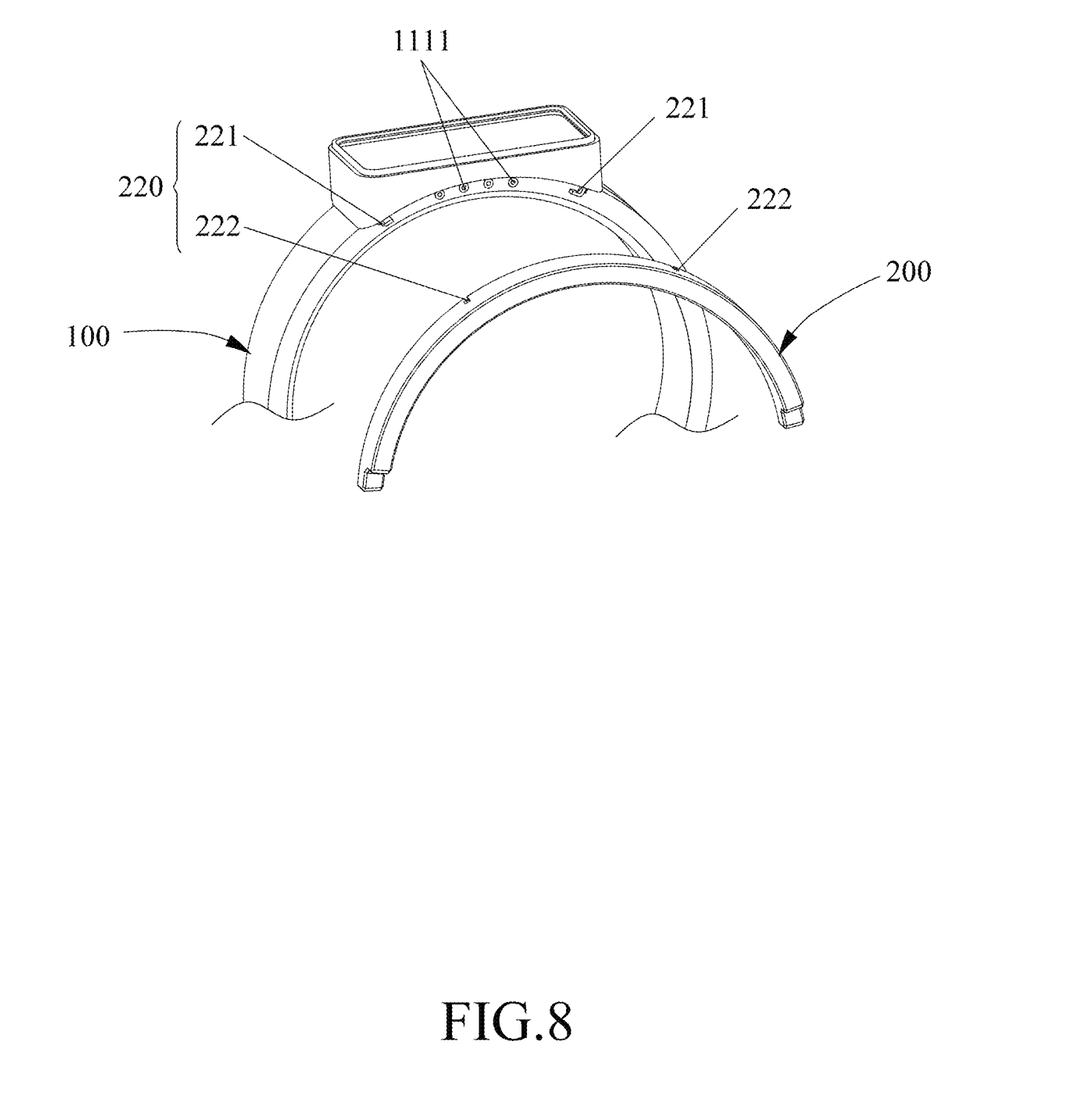
FIG. 8 is a partial view of the modular health monitoring intelligent ring shown in FIG. 2.

Furthermore, in the present invention, the outer shell of the additional accessory 200 is made of elastic silicone material, and the additional accessory 200 as a whole is a C-shaped structure. As shown in FIG. 8, the additional accessory 200 is detachably connected with the main body 100 via a snap-fit device 220. The snap-fit device 220 includes a snap latch 221 and a snap socket 222. The snap latch 221 is arranged on the side wall of the first finger kit 111, and the snap socket 222 is arranged on the side wall of the additional accessory 200. When the additional accessory 200 is spliced with the main body 100, the snap latch 221 is buckled into the snap socket 222.

Figure 9:
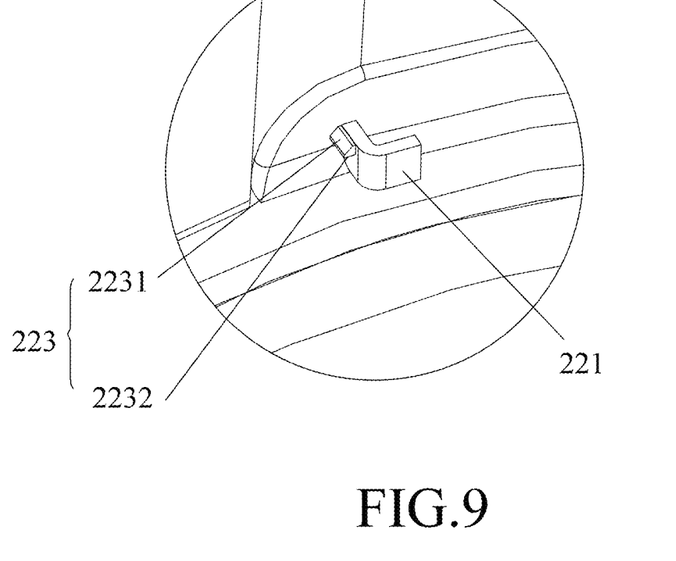
FIG. 9 is a structural view of the snap latch shown in FIG. 8.
Figure 10:
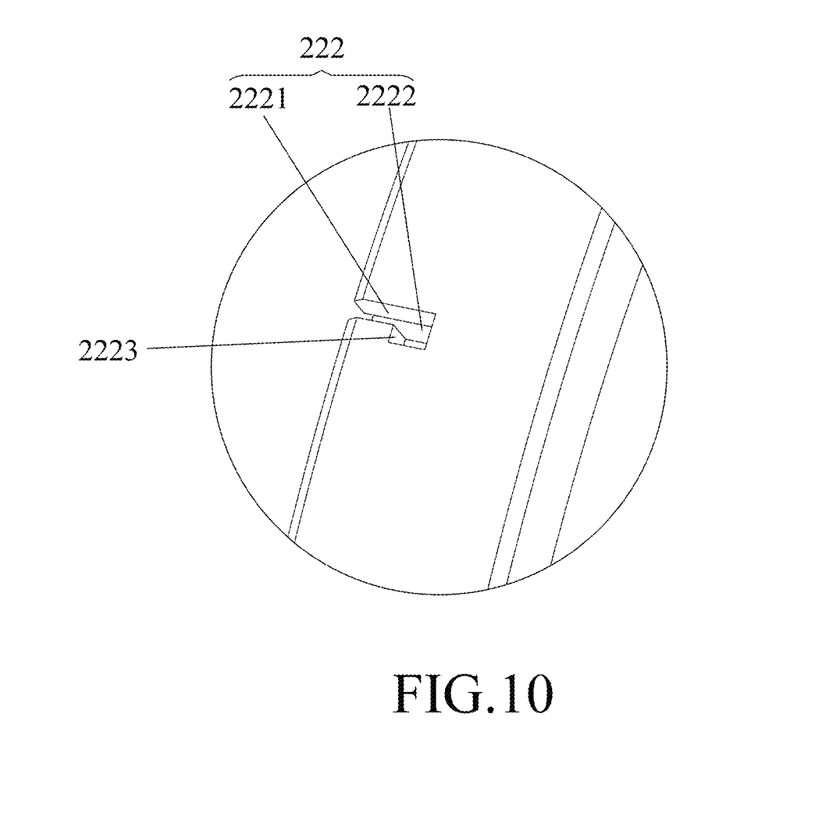
FIG. 10 is a structural view of the snap socket shown in FIG. 8.

As shown in FIG. 9, the snap latch 221 has a one-way protruding tooth 223 disposed thereon, and the one-way protruding tooth 223 has an inclined surface 2231 and a flat surface 2232. As shown in FIG. 10, the snap socket 222 has a plug-in channel 2221 and a snap slot 2222 arranged therein, the snap slot 2222 cooperates with the one-way protruding tooth 223, and the snap slot 2222 has a blocking surface 2223 arranged thereat. When the snap latch 221 is stuck to the snap socket 222, the flat surface 2232 of the one-way protruding tooth 223 is resisted by the blocking surface 2223 of the snap slot 2222.

Through such a structural design, the additional accessory 200 can be conveniently and quickly spliced onto the main body 100 and is not easy to fall off. The principle is as follows:

During the splicing process, the additional accessory 200 approaches the main body 100, and due to the structure of the inclined surface 2231 of the one-way protruding tooth 223, the snap latch 221 can be smoothly inserted into the snap socket 222, thereby completing the splicing. At this time, the one-way protruding tooth 223 is trapped in the snap slot 2222, and the flat surface 2232 is resisted by the blocking surface 2223 of the snap slot 2222, so that the additional accessory 200 is allowed to maintain a stable splicing with the main body 100.

When disassembly is required, the user presses the two free ends of the additional accessory 200, and the additional accessory 200 as a whole will undergo elastic deformation. Since the snap socket 222 is blocked by the snap latch 221, the width of the plug-in channel 2221 will be expanded, so that the blocking surface 2223 of the snap slot 2222 no longer abuts against the flat surface 2232 of the one-way protruding tooth 223. In this way, the snap socket 222 is allowed to be separated from the snap latch 221, that is, the additional accessory 200 is allowed to be easily separated from the main body 100.

It is worth noting that when disassembling, the user needs to press the two free ends of the additional accessory 200 inward, so that the additional accessory 200 undergoes elastic deformation. However, when the modular health monitoring intelligent ring 10 is worn on the user's finger, the additional accessory 200 pressed inwards will be blocked by the finger and cannot be deformed. In other words, the user needs to remove the modular health monitoring intelligent ring 10 from the finger when disassembling, so as to ensure that the additional accessory 200 will not be separated from the main body 100 during the user's wear period.

In addition, the overall size and weight of the additional accessory 200 is significantly smaller than the main body 100, so that the additional accessory 200 of the C-shaped structure will not have a significant impact on the hand feeling after assembling the main body 100, and will not bring too much burden to the user's fingers.

It should also be noted that, as shown in FIG. 5, the annular housing 110 is formed by the combination of the first finger kit 111, the second finger kit 112, and the intermediate finger kit 113, and the connection position between the first finger kit 111 and the intermediate finger kit 113, and the connection position between the second finger kit 112 and the intermediate finger kit 113 all form a stepped gap. After the combination, the edge of the intermediate finger kit 113 can cover the gap formed during the combination. When the user wears the ring, the intermediate finger kit 113 is in direct contact with the skin, and the structure of the intermediate finger kit 113 shielding the gap can effectively prevent the sweat generated by the skin from entering the gap. Compared with the prior art, the modular health monitoring intelligent ring 10 of the present invention is not easy to accumulate dirt in the gap after being worn for a long time, which reduces the accumulation of bacteria and stains and is beneficial to hygiene and health.

Figure 11:
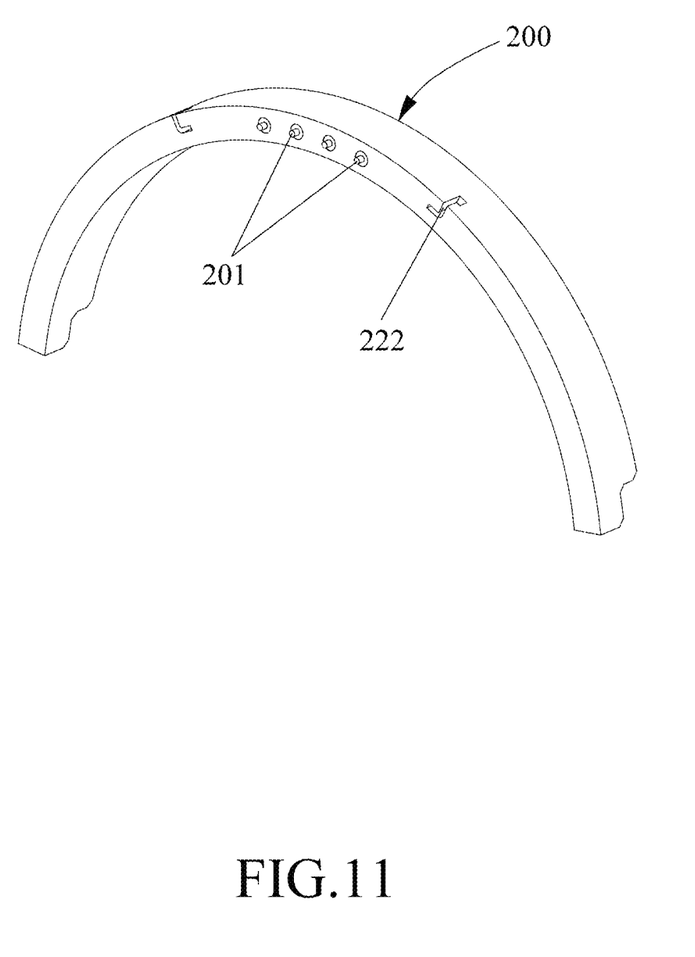
FIG. 11 is a structural view of an additional accessory shown in FIG. 2.

Furthermore, the circuit connection of the increase module device 210 and the basic module device 120 is also required to be realized during splicing. In the embodiment, the additional accessory 200 has one or more pins 201 (as shown in FIG. 11) disposed on the side wall thereof, and the first finger kit 111 has one or more metal conductive sheets 1111 (as shown in FIG. 8) adapted to the pins 201 disposed on the side wall thereof. When the additional accessory 200 is spliced with the main body 100, the pin 201 contacts the metal conductive sheet 1111 to achieve electrical connection between the increase module device 210 and the basic module device 120.

Figure 12:
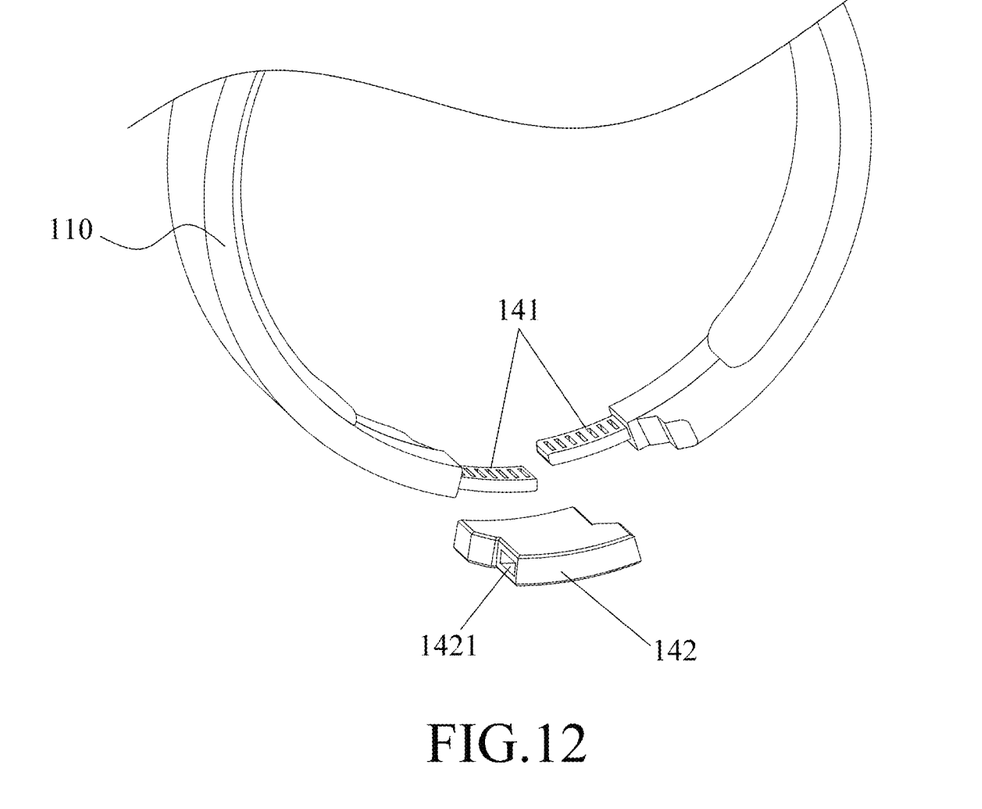
FIG. 12 is an exploded view of the adjusting component of the main body.
Figure 13:
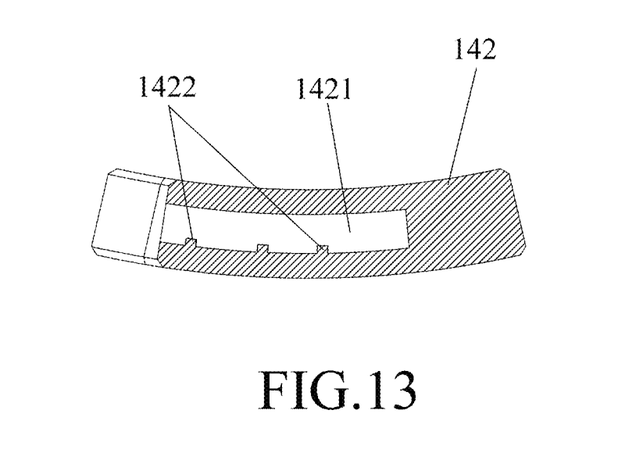
FIG. 13 is a partial sectional view of the fastener shown in FIG. 12.

In the embodiment, as shown in FIGS. 2 and 12, the adjusting component 140 includes two rack belts 141 and a fastener 142. The two rack belts 141 are respectively arranged at the free end of the first finger kit 111 and the free end of the second finger kit 112. The fastener 142 is used to connect the two rack belts 141. The fastener 142 has two grooves 1421 disposed thereon in opposite directions. The two rack belts 141 correspond to the two grooves 1421, respectively. Each of the grooves 1421 has a ridge 1422 arranged therein that matches the tooth surface of each of the rack belts 141 (as shown in FIG. 13).

When in use, the rack belt 141 is inserted into the groove 1421, and the ridge 1422 of the groove 1421 will contact and clamp with the tooth surface of the rack belt 141, thereby achieving fixation; when adjusting, the user applies pressure or pulling force to make the rack belt 141 further enter the groove 1421, or partially withdraw from the groove 1421, that is, change the exposed length of the rack belt 141. Thereby, the inner diameter of the annular housing 110 is adjusted. In this way, the user can conveniently adjust the size of the main body 100 to fit the user's fingers through the adjusting component 140.

It should also be noted that the additional accessory 200 is fixed on the user's finger by being spliced with the main body 100, so there is no need for a connection between the additional accessory 200 and the finger, that is, the additional accessory 200 does not need to be designed as a size-adjustable structure, which can reduce the difficulty and cost of production and manufacturing.

In the present invention, as shown in FIG. 5, the screen device 130 includes a display screen body 131 and an outer frame 132, the outer frame 132 is matched with the installation slot 102, and the display screen body 131 is fixed to the installation slot 102 through the outer frame 132. The display screen body 131 is electrically connected with the main circuit board 121.

In one embodiment, the power supply module 123 includes a wireless charging coil, which is arranged along the circumferential direction of the receiving chamber 101 and is electrically connected with the main circuit board 121. In this way, power can be provided to the basic battery 1231 in a wireless charging manner.

In summary, the modular health monitoring intelligent ring 10 of the present invention can solve the problems of single function and short battery endurance caused by limited internal space by selectively splicing the additional accessory 200, thereby optimizing the user experience and improving the user's wearing comfort.

The above-mentioned embodiments only illustrate several implementation methods of the present invention, and the description thereof is relatively specific and detailed, but they should not be understood as limiting the scope of the invention patent. It should be noted that for the ordinary skilled person in the art, a number of deformations and improvements can be made without departing from the conception of the present invention, which are within the scope of protection of the present invention. Therefore, the scope of protection of the invention patent shall be subject to the attached claims.

What is claimed is:

1. A modular health monitoring intelligent ring, comprising a main body and at least one additional accessory detachably adapted to the main body, wherein
the main body comprises an annular housing, a basic module device, and a screen device, wherein the annular housing has a receiving chamber formed therein, the basic module device is received in the receiving chamber, the annular housing has an installation slot formed on an outer wall thereof, the screen device is installed at the installation slot, and the screen device is electrically connected with the basic module device, wherein the annular housing has an adjusting component disposed thereon for changing an inner diameter of the annular housing;
the annular housing comprises a first finger kit, a second finger kit, and an intermediate finger kit, wherein the first finger kit and the second finger kit are spliced together to form the receiving chamber, the intermediate finger kit is located at an inner wall of the annular housing, and the intermediate finger kit is stuck between the first finger kit and the second finger kit;
the additional accessory has an increase module device disposed therein, and the additional accessory is detachably connected with the main body through a snap-fit device, wherein when the additional accessory is spliced with the main body, and the increase module device is electrically connected with the basic module device, wherein the snap-fit device comprises a snap latch and a snap socket, the snap latch is arranged on the side wall of the first finger kit, and the snap socket is arranged on the side wall of the additional accessory, wherein when the snap latch is buckled into the snap socket, the additional accessory is spliced to a side of the main body, wherein the snap latch has a one-way protruding tooth disposed thereon, and the one-way protruding tooth has an inclined surface and a flat surface, wherein the snap socket has a plug-in channel and a snap slot arranged therein, the snap slot cooperates with the one-way protruding tooth, and the snap slot has a blocking surface arranged thereat, wherein when the snap latch is stuck to the snap socket, the flat surface of the one-way protruding tooth is blocked by the blocking surface;

an outer shell of the additional accessory is made of elastic silicone material, and the additional accessory as a whole is a C-shaped structure.

2. The modular health monitoring intelligent ring, as recited in claim 1, wherein the additional accessory has one or more pins disposed on the side wall thereof, and the first finger kit has one or more metal conductive sheets adapted to the pins disposed on the side wall thereof, wherein when the additional accessory is spliced with the main body, the pins contact the metal conductive sheets to achieve electrical connection between the increase module device and the basic module device.

3. The modular health monitoring intelligent ring, as recited in claim 1, wherein the adjusting component comprises two rack belts and a fastener, wherein the two rack belts are respectively arranged at the free end of the first finger kit and the free end of the second finger kit, the fastener is used to connect the two rack belts;

the fastener has two grooves disposed thereon in opposite directions, the two rack belts correspond to the two grooves, respectively, each of the grooves has a ridge arranged therein that matches the tooth surface of each of the rack belts.

4. The modular health monitoring intelligent ring, as recited in claim 1, wherein the connection position between the first finger kit and the intermediate finger kit, and the connection position between the second finger kit and the intermediate finger kit all form a stepped gap, wherein when the first finger kit, the second finger kit, and the intermediate finger kit are combined with each other, the intermediate finger kit is allowed to cover the gap formed.

5. The modular health monitoring intelligent ring, as recited in claim 1, wherein the basic module device comprises a main circuit board, a processor, and a power supply module, wherein the processor is electrically connected with the power supply module via the main circuit board;

the main circuit board comprises a plurality of flexible printed circuit boards and a plurality of rigid printed circuit boards, and each of the flexible printed circuit boards is disposed between the two adjacent rigid printed circuit boards and is connected with the two rigid printed circuit boards, respectively;

the processor is disposed on one of the plurality of rigid printed circuit boards, and some of the rigid printed circuit boards have resistors and capacitors disposed thereon.

6. The modular health monitoring intelligent ring, as recited in claim 5, wherein the power supply module comprises a basic battery electrically connected with the main circuit board, wherein the basic battery is arranged along the circumferential direction of the receiving chamber, and the basic battery supplies power to the processor, wherein the increase module device comprises a spare battery, wherein when the additional accessory is spliced with the main body, the spare battery supplies power to the basic battery.

7. The modular health monitoring intelligent ring, as recited in claim 6, wherein the power supply module comprises a wireless charging coil, the wireless charging coil is arranged along the circumferential direction of the receiving chamber, and the wireless charging coil is electrically connected with the main circuit board.

8. The modular health monitoring intelligent ring, as recited in claim 5, wherein the main circuit board has a temperature sensor and an acceleration sensor disposed thereon, wherein the temperature sensor and the acceleration sensor are connected with the processor, respectively.

9. The modular health monitoring intelligent ring, as recited in claim 5, wherein the main circuit board has a wireless communication module disposed thereon.

10. The modular health monitoring intelligent ring, as recited in claim 5, wherein the screen device comprises a display screen body and an outer frame, the outer frame is matched with the installation slot, and the display screen body is fixed to the installation slot through the outer frame, wherein the display screen body is electrically connected with the main circuit board.

\* \* \* \* \*